United States Patent Office 3,367,207
Patented Feb. 6, 1968

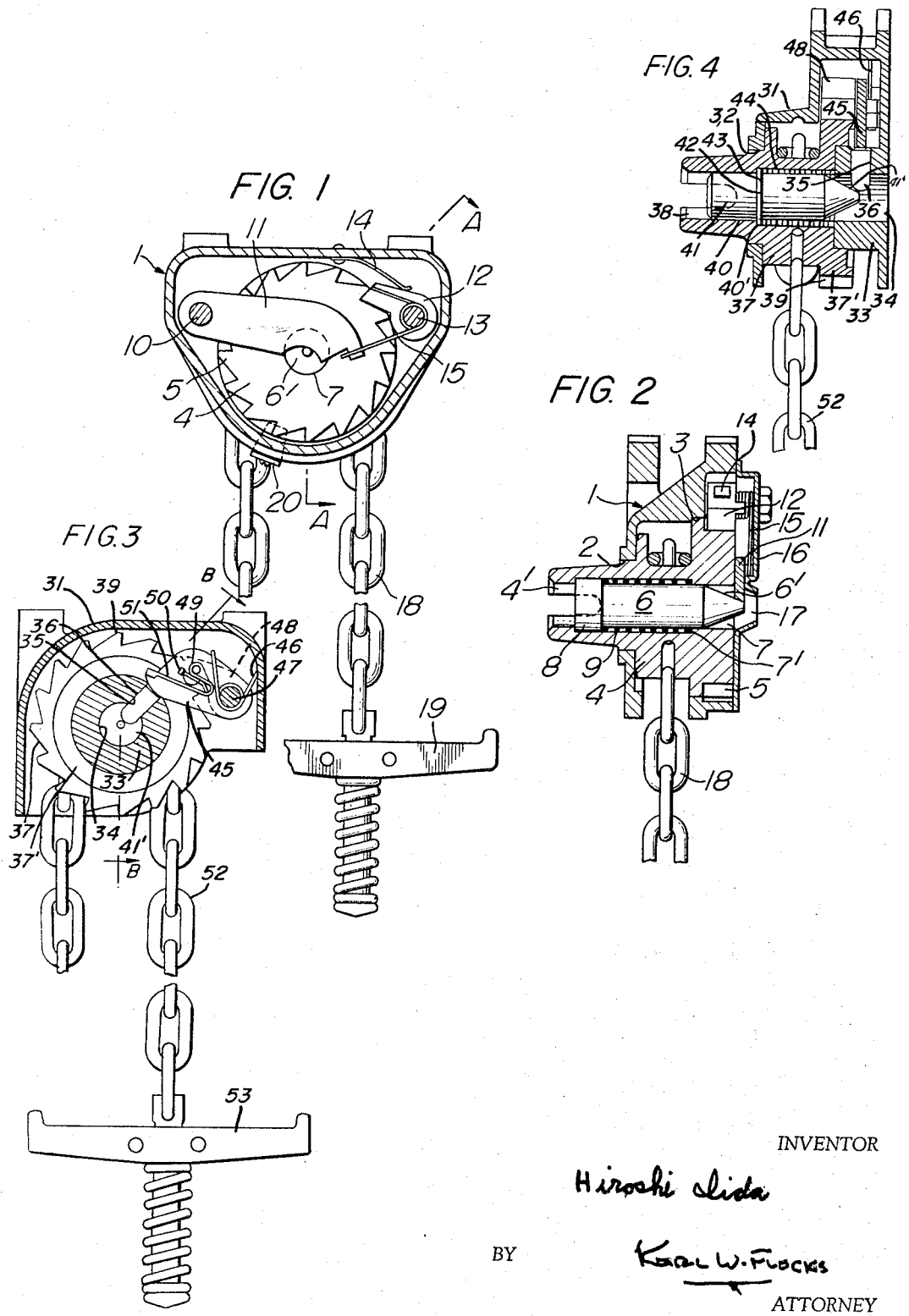

3,367,207
SPARE TIRE AND RIM OR WHEEL CARRIER
Hiroshi Iida, Kariya-shi, Japan, assignor to Shinzo Kondo, Nagoya, Japan
Filed Oct. 29, 1965, Ser. No. 505,713
Claims priority, application Japan, May 7, 1965, 40/26,809, 40/26,810
2 Claims. (Cl. 74—506)

ABSTRACT OF THE DISCLOSURE

A spare tire and rim or wheel carrier which is adapted to be mounted to the underside of the body of an automobile and which comprises a chain wheel rotatably mounted in a box body having ratchet teeth and a handle-receiving socket, a slide pin mounted in a pin hole bored through the chain wheel and having a tapered end thereof in contact with a spring biased cam lever, and a spring having one end bearing against a pawl intermeshing with the ratchet teeth of said chain wheel and the other end depressing said cam lever, whereby when the spare tire and rim or wheel is to be mounted, a chain trailing around the chain wheel and having an anchor plate at one end with said spare tire and rim or wheel mounted thereon is wound up by a handle inserted in the handle-receiving socket, whereas when the spare tire and rim or wheel is dismounted, the chain is unwound upon releasing the engagement between the pawl and ratchet teeth by further inserting the handle with force.

---

The present invention relates to a spare tire and rim or wheel carrier for automotive vehicles which is extremely simple in construction as well as in operational procedure as compared with conventional spare tire and rim or wheel carriers and with which the spare tire can be stored for ready and safe removal.

The present invention will be described in further detail hereinafter by way of the embodiments shown in the accompanying drawings, in which:

FIGURE 1 is a front elevational view of an embodiment of the present invention.

FIGURE 2 is a cross-sectional view taken on the line A—A of FIGURE 1.

FIGURE 3 is a front elevational view of another embodiment of the present invention.

FIGURE 4 is a cross-sectional view taken on line B—B of FIGURE 3.

In the FIGURES 1 and 2, reference numeral 1 is a box body with the lower end open. In the walls of said box body 1 there are formed bearing holes 2 and 3 in opposed relation in which a chain wheel 4 is mounted axially, said chain wheel 4 having a handle engagement portion 4′ formed at one end and ratchet teeth 5 formed peripherally at the other end. A pin hole 7 is bored through the axis of said chain wheel 4 for receiving a slide pin 6 which is surrounded by a coil spring 9 disposed between a shoulder 7′ at an enlarged diameter portion formed at the middle of said pin hole 7 and a flange 8 formed at one end of said pin hole. The slide pin 6 has its end extremity tapered as indicated at 6′ so as to be in engagement with the lower side at the forward portion of a cam lever 11 which is pivoted at the other end to a shaft 10 secured to the box body 1. A pawl 12 is pivoted to a shaft 13 secured to the box body 1 and is usually biased by the depressing force of a spring 14, projecting from the box body 1, to be in engagement with said ratchet teeth 5 so that the chain wheel 4 is permitted to rotate in the ordinary direction freely but is not permitted to rotate reversely. The shaft 13 also holds the middle of a spring 15 which has one end thereof in engagement with the pawl 12 and the other end in engagement with the tip of the cam lever 11 so as to bias the same downwardly, whereby the said cam lever 11 is in pressure contact with the tapered portion 6′ of the slide pin 6. Reference numeral 16 is a cover plate to cover the chain wheel 4 externally, which is mounted to the box body 1 having the cam lever 11 lightly pressed in pivotally movable condition and has bored therein a hole 17 for the projection of the slide pin 6 therethrough. A chain 18 is mounted on the chain wheel 4, said chain, similarly to conventional spare tire and rim or wheel carrier of this type, having one end fixed to the box body 1 and the other extended end connected to a tire anchor plate 19. Reference numeral 20 is a stripper for preventing winding in of chain 18.

With the carrier having the aforementioned construction and mounted to an automobile body, when a spare tire is mounted on the tire anchor plate 19 and a handle engaged in the handle engagement portion 4′ is rotated in the ordinary direction, the chain wheel 4 is rotated with the extended portion of the chain 18 being pulled upward. As the spire time mounted on the tire anchor plate 19 reaches a predetermined level, rotation of the chain wheel 4 is stopped, whereupon the pawl 12 being biased by the depressing force of the spring 14 engages the ratchet wheel 5 to prevent reverse rotation of said chain wheel, with the spare tire positively secured and held in position.

Now, when the spare tire is needed for use, the handle is inserted in the furthermost end of the handle engagement portion 4′, whereupon the slide pin 6 is pushed forward in the pin hole 7 against the coil spring 9 by the forward end of the handle and the cam lever 11 in pressure contact with the forward end of the conical tapered portion 6′ formed at the tip of said slide pin 6 moves pivotally upwardly along said tapered portion 6′ against the spring 15. In this case, while said spring 15 which has one end engaged with the pawl 12 tends to disengage the pawl 12 from the ratchet tooth 5, the engagement between the pawl 12 and the ratchet tooth 5 is not released due to the friction therebetween brought about by the weights of the tire and others, and consequently the spring 15 is compressed. Then the chain wheel 4 is rotated in the ordinary direction to some extent by the handle, whereupon the weights of the tire and others are supported by the handle, thus eliminating the frictional force between the pawl 12 and the ratchet tooth 5. Therefore, the spring 15 which has been compressed with an elastic energy accumulated therein pivotally moves the pawl 12 upwardly against the spring 14 to thereby release the engagement of the pawl 12 with the ratchet tooth 5. Upon rotating the chain wheel 4 in reverse direction, the chain wheel rotates smoothly with the tire anchor plate 19 being lowered together with the spare tire.

It should be noted that while in the embodiment illustrated above the cam lever 11 is pivoted to the shaft 10 at one end so that the cam lever is pivotally movable upwardly, it is also possible to employ a mechanism in which a cam slides upwardly instead of the mechanism in which said cam lever moves pivotally as used in the illustrated embodiment of FIGURES 1 and 2.

Referring now to the embodiment of FIGS. 3 and 4, reference numeral 31 designates a box body which is open at the lower end. In the box body 31 is mounted a bearing member 33 having bearing holes 32 and 34 formed therein in confronting relation. The bearing hole 34 is also formed with a through hole 35 at right angles to the bearing hole 34, with a cam pin 36 mounted therein. A chain wheel 37 forms at one end a handle-receiving socket 38 which is extending through the bearing hole 32, and forms at the other end a bearing portion 37′ which is fitted on the bearing member 33. On the peripheral wall of the bearing portion 37' are provided ratchet teeth 39. The chain wheel 37 has a shouldered-through hole 40 formed axially thereof, and a slide pin 41 having one end 41' tapered into a conical shape is mounted in said through hole 40. The slide pin 41 is formed in the peripheral wall thereof with an annular groove 42, in which is fitted a spring stopper 43 which is in engagement with a shoulder 40' formed on the peripheral wall of the through hole 40. A coil spring 44 is mounted on the slide pin 41 with one end thereof bearing against the spring stopper 43 and the other end bearing against the peripheral edge of the bearing hole 34 in the bearing member 33, so that the tapered end 41' of the slide pin is always held in contact with one end of the cam pin 36 under the bias of said spring 44. The other end of said cam pin 36 is in engagement with a cam 45 which is depressed by the biasing force of a spring 46, so that said cam pin is held in pressure contact with the tapered end 41' of the slide pin. The cam 45 is pivotally mounted on a pin 47 at the upper portion interior of the box body 31 and is urged downwardly by the spring 46 as described. Also mounted in the pivot pin 47 is a pawl 48. The pawl 48 carries at the free end portion thereof a pin 49, which is loosely received in a hole 50 bored through the cam 45, whereby the pawl 48 is held in engagement with the ratchet teeth 39 under the biasing force exerted thereon through the cam 45 and pin 49. Thus, the chain wheel 37 is free to rotate in the ordinary direction but is not permitted to rotate reversely. A spring 51 is provided between the cam 45 and the pin 49 on the pawl 48 so as to keep said pin 49 normally in pressure contact with the upper peripheral edge of the hole 50. A chain 52 trails around the chain wheel 37, with one end secured to the box body 31 and the other end connected to an anchor plate 53, like conventional spare tire and rim or wheel carriers of this type.

The carrier of the construction described above is mounted to the body of an automobile. In use, a spare tire and rim or wheel is mounted on the anchor plate 53 and a handle inserted in the handle-receiving socket 38 is cranked in the ordinary direction. The chain wheel 37 is rotated winding the chain 52. When the spare tire and rim or wheel on the anchor plate 53 has reached a predetermined position, cranking of the chain wheel 37 is stopped, whereupon the pawl 48 comes in engagement with the ratchet teeth 39 under the depressing force of the spring 51, thus preventing the chain wheel from reversing. In the manner described, the spare tire and rim or wheel is securely held in the carrier positively in a safe condition. Now, when the spare tire and rim or wheel is needed, the handle is inserted to the bottom end of the handle-receiving socket 38, forcing the slide pin 41 to proceed in the shouldered axial hole 40 in the chain wheel 37 at its end against the force of the coil spring 44, whereby the cam pin 36 in pressure contact with the tapered end 41' of the slide pin 41 is caused to retract into the pin hole 35 by the tapered end 41' against the force of the spring 46 while causing a pivotal upward movement of the cam 45. In this case, the spring 51 tends to bring the pawl 48 out of engagement with the ratchet teeth 39 through the pin 49, but the pawl 48 is not disengaged from the ratchet teeth 39 due to the friction therebetween caused by the weight of the spare tire and rim or wheel and others. However, the upward movement of the cam 45 results in the pin 49 moving away from the upper peripheral edge of the hole 50 in said cam 45 against the bias of the spring 51 and thereby the spring 51 is compressed. Under this condition, the chain wheel 37 is rotated slightly in the ordinary direction by the handle, whereupon the pawl 48 is freed from the load and the friction between said pawl and ratchet teeth 39 is eliminated, as the weight of the spare tire and rim or wheel is supported by the handle, with the result that the spring 51 is allowed to return to its original state, bringing the pin 49 into pressure contact with the upper peripheral edge of the hole 50 of cam 45 again. Consequently, the pawl 48 carrying the pin 49 makes a pivotal movement upon being smoothly released from engagement with the ratchet teeth 39. Thereafter, the chain wheel 37 is rotated in a reverse direction, whereby the chain 52 is unwound smoothly and the anchor plate 53 is lowered with the spare tire and rim or wheel thereon.

As will be clearly understood from the foregoing description, it is possible, with the claimed carrier, to hold the spare tire and rim or wheel positively and safely when it is mounted thereto by the anchor plate, because the chain wheel is not permitted to rotate reversely due to the engagement between the pawl and chain wheel under pressure, and to remove the spare tire and rim or wheel, when it is needed, by a simple operation by eliminating the load from the pawl, releasing the engagement between the pawl and the ratchet teeth of chain wheel without force and reversing the chain wheel smoothly.

As will be apparent from the foregoing explanation given by way of the embodiments, according to the present invention, it is possible to simplify the construction by axially supporting in the box body the chain wheel having the ratchet wheel and handle engagement portion, to secure the spare tire positively by means of engagement of the pawl under the depression force of the spring with the ratchet tooth of the chain wheel, and to lower the spare tire smoothly by a simple operation comprising pushing forward the slide pin disposed in the pin hole provided axially at the center of the chain wheel by the handle, thereby displacing the cam lever, rotating the chain wheel in the ordinary direction to some extent under said condition and then rotating said chain wheel reversely. In addition, because of the simplified construction, the carrier is serviceable for a lengthy period of time and further it may be provided in compact form with ease as compared with conventional ones of the prior art.

What is claimed is:

1. In a spare tire and rim or wheel carrier, the combination of a chain wheel having ratchet teeth and a handle-receiving socket and rotatably mounted in a box body, a slide pin mounted in an axial hole in said chain wheel and having one end tapered into a conical shape, said tapered end normally being in contact with the lower edge of a cam lever under the bias of a coil spring mounted on said slide pin, and a spring having one end bearing against a pawl in engagement with the ratchet teeth of said chain wheel and the other end depressing said cam lever.

2. In a spare tire and rim or wheel carrier, the combination of a slide pin mounted in an axial hole in a chain wheel having ratchet teeth and having one end tapered into a conical shape, said chain wheel being provided with a handle-receiving socket at one end and said tapered end normally being in contact with one end of a cam pin under the bias of a coil spring mounted on said slide pin, a cam pivotally mounted on a pin and held in contact with the other end of said cam pin, said cam being depressed by a spring, a pin in engagement with said ratchet teeth and extending from a pawl pivotally mounted on said first pin and loosely received in a hole bored through said cam, and a spring provided between said cam and said second pin.

References Cited

UNITED STATES PATENTS

| | | | |
|---|---|---|---|
| 1,377,628 | 5/1921 | Rochambeau | 74—505 |
| 1,719,850 | 7/1929 | Price | 74—506 |
| 2,603,101 | 7/1952 | Dath | 74—505 |

MILTON KAUFMAN, *Primary Examiner.*